United States Patent [19]

Kim

[11] 3,856,693

[45] Dec. 24, 1974

[54] METHOD FOR PRODUCING LEAD ZIRCONATE TITANATE POLYCRYSTALLINE CERAMICS

[75] Inventor: You Song Kim, Emmaus, Pa.

[73] Assignee: Bell Telephone Laboratories, Incorporated, Murray Hill, N.J.

[22] Filed: Dec. 18, 1972

[21] Appl. No.: 316,254

[52] U.S. Cl. .............................................. 252/62.9
[51] Int. Cl. ....................... C04b 35/46, C04b 35/48
[58] Field of Search .................................... 252/62.9

[56] References Cited

UNITED STATES PATENTS

| | | | |
|---|---|---|---|
| 2,911,370 | 11/1959 | Kulcsar | 252/62.9 |
| 2,915,407 | 12/1959 | Gulton | 252/62.9 X |
| 3,144,411 | 8/1964 | Kulcsar et al. | 252/62.9 |
| 3,344,073 | 9/1967 | Bratschun | 252/62.9 |
| 3,580,846 | 5/1971 | Okuyama et al. | 252/62.9 |

OTHER PUBLICATIONS

Takahashi et al. –"Japan J. Appl. Phys. 9, No. 8 (1970) P. 1009.

*Primary Examiner*—Jack Cooper
*Attorney, Agent, or Firm*—J. C. Fox; G. S. Indig

[57] ABSTRACT

A combination of critical calcining and firing conditions together with control of particle size of the calcined material and control of the harmful impurities $SiO_2$ and $Al_2O_3$ enables processing of polycrystalline ceramic bodies of lead zirconate titanate (PZT) containing about 1 percent $Nb_2O_5$ to densities of at least 99.7 percent of theoretical density. In addition, such PZT bodies exhibit a radial coupling coefficient greater than 60 percent. Applications include use as a piezoelectric element in microphone transducers.

7 Claims, 2 Drawing Figures

METHOD FOR PRODUCING LEAD ZIRCONATE TITANATE POLYCRYSTALLINE CERAMICS

BACKGROUND OF THE INVENTION

This invention relates to a polycrystalline ceramic lead zirconate titanate composition having piezoelectric properties, to a method for processing such a composition to optimum density and to devices using it. Lead zirconate titanate (PZT) ceramics have been proposed for use in acoustoelectric transducers such as microphones, receivers and speakers.

In order to make effective use of a ceramic piezoelectric transducer, however, a number of design problems must be overcome. For example, optimizing the low frequency sensitivity of an electroacoustic transducer dictates the use of thin ceramic plates in the transducer element. For PZT compositions presently being considered for their optimum piezoelectric properties, optimum thicknesses are on the order of 0.005 centimeters. At such thicknesses even slight porosity (a few percent) could lead to high mechanical breakage, unsatisfactory dielectric breakdown strength, or even pinhole shorts formed during application of the electrodes. Unfortunately, for the compositions of interest, the highest reported sintered densities are around 98 percent of theoretical density, too low to permit economic fabrication of these materials into the thin plates needed for optimum microphone designs.

SUMMARY OF THE INVENTION

Polycrystalline ceramic bodies of PZT with a niobium addition having the nominal composition in weight percent 68 percent PbO, 19.58 percent $ZrO_2$, 11.5 percent $TiO_2$ and 0.86 percent $Nb_2O_5$ are produced by a process which yields the highest consistently reproducible values of density and radial coupling coefficient yet seen for this material. The process depends upon critical sintering and calcining steps, close control of calcined particle size and limitation of the harmful impurities alumina and silica.

Processing includes: mixing raw materials preferably initially containing not more than a combined total of 0.02 weight percent silica and alumina, such as by ball milling in equipment chosen to minimize further pickup of these impurities; calcining at a temperature of from 900° to 1100° C for from 2 to 20 hours; comminuting the calcined product to a granule size up to 44 microns; forming the calcined material into a structurally integrated body; and sintering the body in an oxygen atmosphere at a temperature of from 1240° C to 1300° C for from 1 to 8 hours.

Any additional pickup of the impurities $SiO_2$ and $Al_2O_3$ during processing, such as by erosion of the milling equipment, should be controlled so that the total amounts of these impurities do not exceed 0.07 and 0.15 weight percent, respectively, in the sintered product. Furthermore, since the composition is critical for the obtaining of optimum piezoelectric properties, processing should be carried out under conditions which prevent or compensate for excessive loss by volatilization. In one embodiment, excess PbO is added to the starting composition to compensate for such loss.

The polycrystalline material produced in accordance with this process consistently exhibits densities of at least 99.7 percent of theoretical density and radial coupling coefficients of at least 60 percent where radial coupling coefficient ($k_p$) is defined as the electromechanical coupling factor in the radially symmetric extensional mode. Electromechanical coupling factor is the relation between mechanical energy stored and electrical energy applied, or vice versa.

The processed material is suitable for use in a variety of applications including use as a transducer element or as a component of a transducer element in electroacoustic devices such as microphones, receivers and speakers, and accordingly, such materials and devices form a part of the invention.

DETAILED DESCRIPTION OF THE INVENTION

Figure 1:
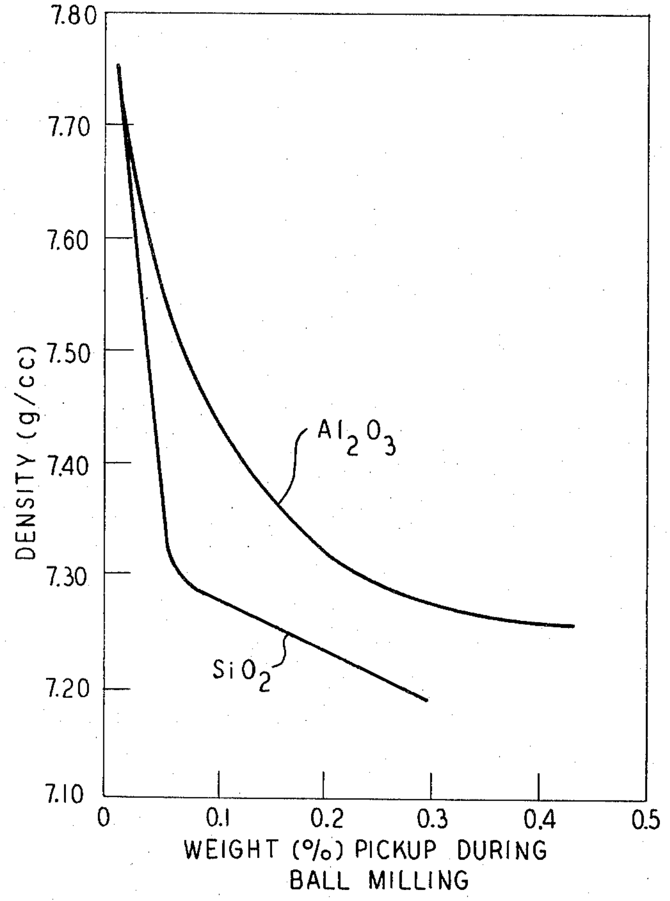
FIG. 1 is a graph of sintered density in grams per cubic centimeter versus pickup of impurities $Al_2O_3$ and $SiO_2$ in weight percent during ball milling of a PZT composition of the invention.

The polycrystalline ceramic body of the invention is produced from starting materials such as oxides or other compounds which when heated yield to oxides to give compositions in weight percent within the range of 65.0 to 70.0 percent PbO, 19.5 to 21.1 percent $ZrO_2$, 9.0 to 13.8 percent $TiO_2$ and 0.4 to 1.5 percent $Nb_2O_5$. Outside this range, electrical and piezoelectric properties tend to drop to lower values. For optimum properties, it is preferred to maintain compositions within the range 67 to 68.5 percent PbO, 19.5 to 20.1 percent $ZrO_2$, 11 to 11.5 percent $TiO_2$ and 0.4 to 1.2 percent $Nb_2O_5$. Commercially available starting materials will ordinarily be suitable for the practice of the invention, although the combined total of $Al_2O_3$ and $SiO_2$ from all sources should preferably be kept below 0.02 weight percent in the starting materials, above which additional pickup of these impurities from various sources during processing could lead to total final amounts sufficient to significantly interfere with the obtaining of an optimum density of sintered product. The starting material should be thoroughly mixed to insure that subsequent reactions take place completely and uniformly. Mixing is customarily carried out by forming an aqueous or organic slurry in a ball mill. Milling equipment should be chosen in order to minimize additional pickup of the impurities $Al_2O_3$ and $SiO_2$ by erosion or leaching thereof during milling. It has been found, for example, that use of a plastic milling container such as polyethylene in conjunction with high purity (95 percent), high density (95 percent) balls of a material such as alumina or zirconia give excellent results. The total additional pickup of $SiO_2$ and $Al_2O_3$ from all sources including milling should be controlled so that the total amounts of these impurities do not exceed 0.07 and 0.15 weight percent, respectively, and preferably do not exceed 0.03 and 0.07 weight percent, respectively. The milled material is then dried, granulated and prereacted by calcining. It has been found that calcining is critical to the obtaining of a suitable product, and should be carried out at a temperature of 900° C to 1100° C for from 2 to 20 hours. Powders calcined at temperatures below 900° C or for times less than 2 hours become fluffy, are difficult to screen and to compact, and thus are difficult to sinter to maximum density. Calcining above 1100° C or longer than 20 hours results in excessive lead loss by volatilization, leading to undesirable compositional shifts, and also results in the formation of hard agglomerates which are not readily screenable, and which may remain as low density areas in the sintered product. Based upon these considerations, calcining between 900° and 1000° C for 8 to 16 hours is preferred.

Comminuting this dried, calcined material such as by screening through a fine mesh sieve, prior to the forming operation, has been found to be essential to the obtaining of maximum sintered density. Screening through a320 mesh sieve results in granule sizes of up to 44 microns in diameter, resulting in substantial removal of any agglomerates not crushed during milling which would otherwise remain as low density areas in the sintered material. Screening to smaller granule sizes (up to 37 microns using a 400 mesh sieve) may be preferred for the achievement of optimum densities. Ball milling the calcined material to a slurry and drying as above may render subsequent comminution easier to effect.

Forming operations include tape casting, dry pressing and continuous hot pressing. The usual forming aids such as binders, lubricants and plasticizers may be employed during forming. While continuous hot pressing leads directly to a high density product, the tape cast or dry pressed material must be sintered in an oxygen atmosphere in order to enhance densification. The sintering atmosphere should be substantially pure oxygen, although a positive oxygen pressure is unnecessary. A convenient way to achieve this atmosphere is to introduce pure oxygen into the open end of a tube furnace at a flow rate of about 150 cubic centimeters per minute. Sintering should be carried out from 1240° C to 1300° C for 1 to 8 hours, below which optimum density will not be achieved and above which lead loss may become excessive and some melting may occur. It is preferred to sinter at a temperature from 1280° C to 1300° C for 2 to 4 hours in order to achieve optimum density.

During sintering, precautions should be exercized to avoid excessive lead loss by volatilization, such as for example, covering the pressed part with powder of the same composition, adding a compensatory excess of lead to the starting composition, carrying out sintering in a sealed container, or a combination of one or more of these steps. As was already stated, such lead loss may be significant in shifting the composition outside the range in which optimum piezoelectric properties have been observed.

EXAMPLE 1

General Procedure

PZT compositions were weighed using raw materials PbO, $ZrO_2$, $TiO_2$ and $Nb_2O_5$. The combined weight of the impurities $Al_2O_3$ and $SiO_2$ was 0.02 weight percent. The weighed batches were ball milled in pure water for 2 hours. The resultant slurry was transferred to pans and the water decanted after 2 to 3 hours of solids settling. These solids were dried for 16 hours at 120° C, granulated by passing through a 60 mesh sieve, and calcined in platinum lined boats. The calcined material was again ball milled in pure water and dried as above. The dried material was screened and isostatically pressed at 20 pounds per square inch for 5 minutes into 1.9 centimeter diameter rods, 5 to 12 centimeters in length. These rods were covered with powder from the weighed batch in a platinum lined vessel and mechanically sealed in with a platinum cover. They were then sintered in a 7.6 centimeter diameter tube furnace.

Effect of Impurities

In order to investigate the effects of the impurities $Al_2O_3$ and $SiO_2$ on sintered density, several batches were weighed to give a starting composition of 68 percent PbO, 19.5 percent $ZrO_2$, 11.5 percent $TiO_2$, 0.86 percent $Nb_2O_5$, 0.01 percent $Al_2O_3$ and 0.01 percent $SiO_2$. These batches were processed in accordance with the general procedure outlined above except that ball milling was carried out using three different sets of milling equipment. A first set included a rubber lined steel jar with Burundum balls (Burundum is a trademark for an aluminosilicate material having the approximate composition 85 percent $Al_2O_3$, 12 percent $SiO_2$, 2 percent CaO). A second set included the rubber lined jar with high purity (99.95 percent), high density (95 percent) $Al_2O_3$ balls and a third set included a polyethylene jar with the high purity, high density $Al_2O_3$ balls. After milling, the batches were subjected to microprobe analysis and were then processed into sintered rods. Calcining was carried out at 950° C for 2 hours in air; the dried, calcined material was screened through a 400 mesh sieve; and the pressed parts were sintered at 1205° C for 2 hours in air. Apparent density was determined using the Archimedes principle. Results are shown in Table I in which the level of the impurities $Al_2O_3$ and $SiO_2$ picked up during ball milling are seen to decrease with use of the polyethylene jar and alumina balls, and the sintered density is seen to increase with decreasing levels of these impurities.

TABLE I

Microprobe Analysis of PZT Mixes for Ball Mill Pickup

| Run | $Al_2O_3$, Wt. % | $SiO_2$, Wt. % | Density (g/cc) |
|---|---|---|---|
| 1 | 0.72 | 0.24 | 7.17 |
| 2 | 0.34 | 0.08 | 7.24 |
| 3 | 0.02 | 0.06 | 7.71 |
| 4 | 0.02 | 0.02 | 7.75 |

Run 4 — PZT starting composition.
Run 1 — PZT ball milled in a rubber lined jar with Burundum balls.
Run 2 — PZT ball milled in a rubber lined jar with alumina balls.
Run 3 — PZT ball milled in a polyethylene jar with alumina balls.

This effect is graphically depicted in FIG. 1 in which sintered density in grams per cubic centimeter is plotted versus weight percent pickup during ball milling of the impurities $SiO_2$ and $Al_2O_3$ wherein it is seen that as the batches pick up increasing amounts of these impurities during milling, they become progressively more difficult to sinter to a higher density.

EXAMPLE 2

Using the optimum milling technique for minimization of impurities determined in Example 1, four different batches having the compositions shown in Table II were prepared and processed into sintered rods in accordance with the general procedure.

TABLE II

| CHEMICAL COMPOSITION OF PZT | | | | | | |
|---|---|---|---|---|---|---|
| Composition | PbO | $ZrO_2$ | $TiO_2$ | $Nb_2O_5$ | $SiO_2$ | $Al_2O_3$ |
| No. 1 | 68.00 | 19.58 | 11.50 | 0.86 | 0.01 | 0.008 |
| No. 2 | 68.24 | 19.58 | 11.45 | 0.58 | 0.01 | 0.008 |
| No. 3 | 67.63 | 19.50 | 11.40 | 0.44 | 0.01 | 0.008 |
| No. 4 | 67.05 | 20.00 | 11.13 | 1.15 | 0.01 | 0.008 |

Calcining was carried out at 950° C for 2 hours in air and the calcined material was screened through a 400 mesh sieve. Sintering was carried out at 1290° C for 2 hours in an oxygen flow of 150 cubic centimeters per minute. Examination of polished samples of the four materials revealed essentially pore free microstructures having uniform grain sizes with no apparent second phase present. Densities ranged from 7.976 grams per cubic centimeter, equivalent to 99.7 percent of theoretical density, to 7.984 grams per cubic centimeter, equivalent to 99.8 percent of theoretical density. In order to evaluate electromechanical properties, the sintered rods were sliced into disks approximately 1.475 centimeters in diameter and 0.015 centimeters thick. Electrodes were evaporated onto the disks and the disks were poled in a d.c. field of $20 \times 10^3$ volts per centimeter at 150° C for 120 minutes in air. Several piezoelectric properties were measured for the four compositions and are presented in Table III.

TABLE III

| PIEZOELECTRIC PROPERTIES OF PZT | Composition | | | |
|---|---|---|---|---|
| | No. 1 | No. 2 | No. 3 | No. 4 |
| $\epsilon_{33}^T$ | 1854–1896 | 1889–1945 | 1681–1791 | 1585–1645 |
| D | 0.02 | 0.02 | 0.02 | 0.02 |
| $k_p$ | 0.62–0.63 | 0.63–0.64 | 0.65–0.66 | 0.65–0.66 |
| $\nu^E$ | 0.341–0.388 | 0.364–0.379 | 0.343–0.424 | 0.306–0.340 |
| $Q_m$ | 72.4 | 73.5 | 63.5 | 70.0 |

$\epsilon_{33}^T$ — Dielectric constant
D — Dissipation factor
$k_p$ — Radial coupling coefficient
$\nu^E$ — Poisson's ratio
$Q_m$ — Mechanical Quality Factor It will be noted from the Table that the radial coupling coefficient $k_p$ has a value of at least 0.62 (62 percent) which is significantly higher than that normally reported for these PZT compositions. Similarly, the other properties recorded in the Table represent improvements over those values exhibited by commercially available PZT materials. All values reported in Table III are average values for from 6 to 12 samples from each batch or lot.

Table IV shows average plus standard deviations from average values for $\epsilon^T_{33}$ and $k_p$ on eight different batches or lots for compositions 1 and 2 in order to demonstrate reproducibility of these properties. As may be seen, both interlot and intralot reproducibility are satisfactory.

TABLE IV

| REPRODUCIBILITY OF ELECTRICAL PROPERTIES OF PZT | | | | |
|---|---|---|---|---|
| Composition | Lot | No. of Samples | $\epsilon_{33}^T \pm 3\sigma$ | $k_p \pm 3\sigma$ |
| No. 1 | 1 | 10 | 1880 ± 56 | 0.625 ± 0.005 |
| | 2 | 10 | 1875 ± 73 | 0.629 ± 0.011 |
| | 3 | 5 | 1840 ± 82 | 0.620 ± 0.009 |
| | 4 | 10 | 1865 ± 56 | 0.650 ± 0.006 |
| No. 2 | 1 | 10 | 1915 ± 75 | 0.628 ± 0.015 |
| | 2 | 10 | 1860 ± 150 | 0.660 ± 0.012 |
| | 3 | 10 | 1860 ± 33 | 0.635 ± 0.015 |
| | 4 | 10 | 1870 ± 73 | 0.620 ± 0.015 |
| | | Average Intralot Deviation | 1840 ± 83 | 0.620 ± 0.011 |
| | | Interlot Deviation | 1860 ± 150 | 0.620 ± 0.014 |

EXAMPLE 3

The procedure of Example 2 was followed for a composition $Pb(Zr_{0.520}Ti_{0.405}Nb_{0.15})O_3$. Lead loss during processing was compensated by a 0.2 percent PbO addition to the composition. A sintered density of 7.90 grams per cubic centimeter, equivalent to 99.87 percent of theoretical density was obtained, and wafers were machined to a 50 micrometer thickness without breakage.

Figure 2:
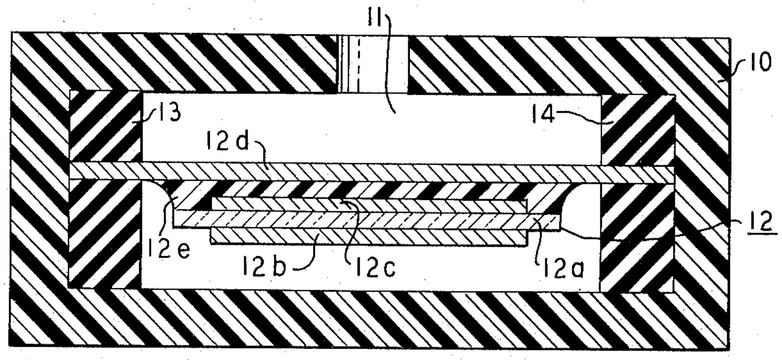
FIG. 2 is a section view of one embodiment of an electroacoustic device incorporating a PZT transducer produced in accordance with the invention.

Referring now to FIG. 2, there is shown a front section view of an electroacoustic transducer utilized to convert sound energy to electrical energy and vice versa, incorporating the piezoelectric body of the invention and useful for example as a microphone, receiver or speaker. The transducer comprises a housing, designated as 10, defining an internal chamber 11 and a planar electromechanical transducing element within the chamber designated generally as 12. Means for supporting element 12 within the chamber 11 comprises annular washers 13 and 14. Transducing element 12 includes a planar body of PZT processed in accordance with the invention, designated as 12*a* and having electrodes 12*b* and 12*c* applied to the plane faces thereof. This electroded body is bonded to a larger metal plate 12*d* via bonding medium 12*e*. Poling of the PZT body may be accomplished prior to assembly or in assembled form by applying a d.c. field, for example, $20 \times 10^3$ volts per centimeter at a temperature of 130° to 150° C. The thickness, density and modulus of elasticity of the metal plate are chosen so that the neutral bending plane of the composite element is located at the metal-ceramic interface, thus producing a uniaxial stress within the ceramic body. In use as a microphone the ceramic body will thus generate a voltage proportional to the compressive or expansive forces applied thereto. Other designs for the transducer element are known and may advantageously incorporate the material of the invention. For example, a so-called bimorph comprises two ceramic disks electroded and bonded together in a known manner so as to obtain a net output in response to an acoustic signal.

The invention has been described in terms of a limited number of embodiments. Other embodiments are within the skill of the art to effect and are thus intended to be encompassed within the description and appended claims. For example, certain non-critical steps such as milling, granulating and drying may be repeated one or more times during processing consistent with good practice in the ceramic art without impairing the final result.

What is claimed is:

1. A process for producing a piezoelectric lead zirconate titanate polycrystalline body comprising sintering a structurally integrated body of comminuted material, said material having been produced by: forming a mixture of oxides or compounds which upon heating yield the oxides by combining constituents equivalent to 65 to 70 weight percent PbO, 19.5 to 21.1 weight percent $ZrO_2$, 9 to 13.8 weight percent $TiO_2$ and 0.4 to 1.5 weight percent $Nb_2O_5$; calcining the mixture; and comminuting the calcined material; characterized in that:

calcining is carried out at a temperature of from 900° to 1100° C for from 2 to 20 hours; comminuting is carried out to achieve a granule size of up to 44 microns; sintering is carried out in a substantially pure oxygen atomsphere at a temperature of from 1240° to 1300° C for from 1 to 8 hours;

and further characterized in that amounts of $SiO_2$ and $Al_2O_3$ in the sintered product are limited to 0.07 weight percent and 0.15 weight percent, respectively.

2. The process of claim 1 in which the constituents are equivalent to 67 to 68.5 weight percent PbO, 19.5 to 20.1 weight percent $ZrO_2$, 11 to 11.5 weight percent $TiO_2$ and 0.4 to 1.2 weight percent $Nb_2O_5$.

3. The process of claim 1 in which calcining is carried out at a temperature of from 900° C to 1000° C for 8 to 16 hours.

4. The process of claim 1 in which comminuting the calcined product is carried out to a granule size of up to 37 microns.

5. The process of claim 1 in which sintering is carried out at a temperature of from 1280° C to 1300° C for 2 to 4 hours.

6. The process of claim 1 in which the amounts of $SiO_2$ and $Al_2O_3$ in the sintered product are limited to 0.03 and 0.07 weight percent, respectively.

7. The process of claim 1 in which process PbO is added to the mixture to compensate for loss of PbO by volatilization during processing.

* * * * *